United States Patent
Esquivel et al.

(10) Patent No.: US 12,269,019 B2
(45) Date of Patent: Apr. 8, 2025

(54) HETEROGENEOUS CATALYST WITH MULTICATALYTIC ACTIVITY

(71) Applicant: INSTITUTO MEXICANO DEL PETRÓLEO, Mexico City (MX)

(72) Inventors: José Manuel Domínguez Esquivel, Mexico City (MX); Alma Delia Miranda Olvera, Mexico City (MX); Miguel Ángel Vázquez Guevara, Mexico City (MX); Adriana del Carmen Galván Cabrera, Mexico City (MX); Merced Martínez Rosales, Mexico City (MX)

(73) Assignee: INSTITUTO MEXICANO DEL PETRÓLEO, Mexico City (MX)

( * ) Notice: Subject to any disclaimer, the term of this patent is extended or adjusted under 35 U.S.C. 154(b) by 13 days.

(21) Appl. No.: 17/884,505

(22) Filed: Aug. 9, 2022

(65) Prior Publication Data
US 2023/0064148 A1 Mar. 2, 2023

(30) Foreign Application Priority Data
Aug. 9, 2021 (MX) .................... MX/a/2021/009548

(51) Int. Cl.
B01J 31/02 (2006.01)
B01J 21/08 (2006.01)

(52) U.S. Cl.
CPC ........... *B01J 31/0284* (2013.01); *B01J 21/08* (2013.01)

(58) Field of Classification Search
None
See application file for complete search history.

(56) References Cited

FOREIGN PATENT DOCUMENTS

| CN | 1796347 A | * | 7/2006 |
|---|---|---|---|
| CN | 107930688 A | * | 4/2018 |
| CN | 109942419 A | * | 6/2019 |

OTHER PUBLICATIONS

Muller et al., "A Multicatalyst System for the One-Pot Desymmetrization/Oxidation of meso-1,2-Alkane Diols", Chem. Eur. J. 2011, 17, 6309-6314.

(Continued)

*Primary Examiner* — Yun Qian
(74) *Attorney, Agent, or Firm* — FisherBroyles, LLP; Jason P. Mueller

(57) ABSTRACT

In this invention is described: a) the preparation of a new heterogeneous catalyst based on mesoporous silica with variable geometry of pore arrangement, covalently functionalized by an ionic liquid and as a counterion a tungsten polyoxometalate (Keggin acid); b) the application of this catalyst with dual action: Bronsted-Lowry acid and oxidizing agent; and c) its application in chemical reactions is described as: condensation, oxidation, polymerization, and esterification. This type of catalyst offers the following advantages in the chemical industry 1) reusable; 2) promotes different transformations in a single stage, attributed to their acidic and oxidizing characteristics (dual action); and 3) efficiency in the chemical transformations described, which allow to obtain precursors of homogeneous hydroprocessing catalysts, of interest for some projects of transformation of heavy crude oils in situ.

23 Claims, 2 Drawing Sheets

Figure 1:
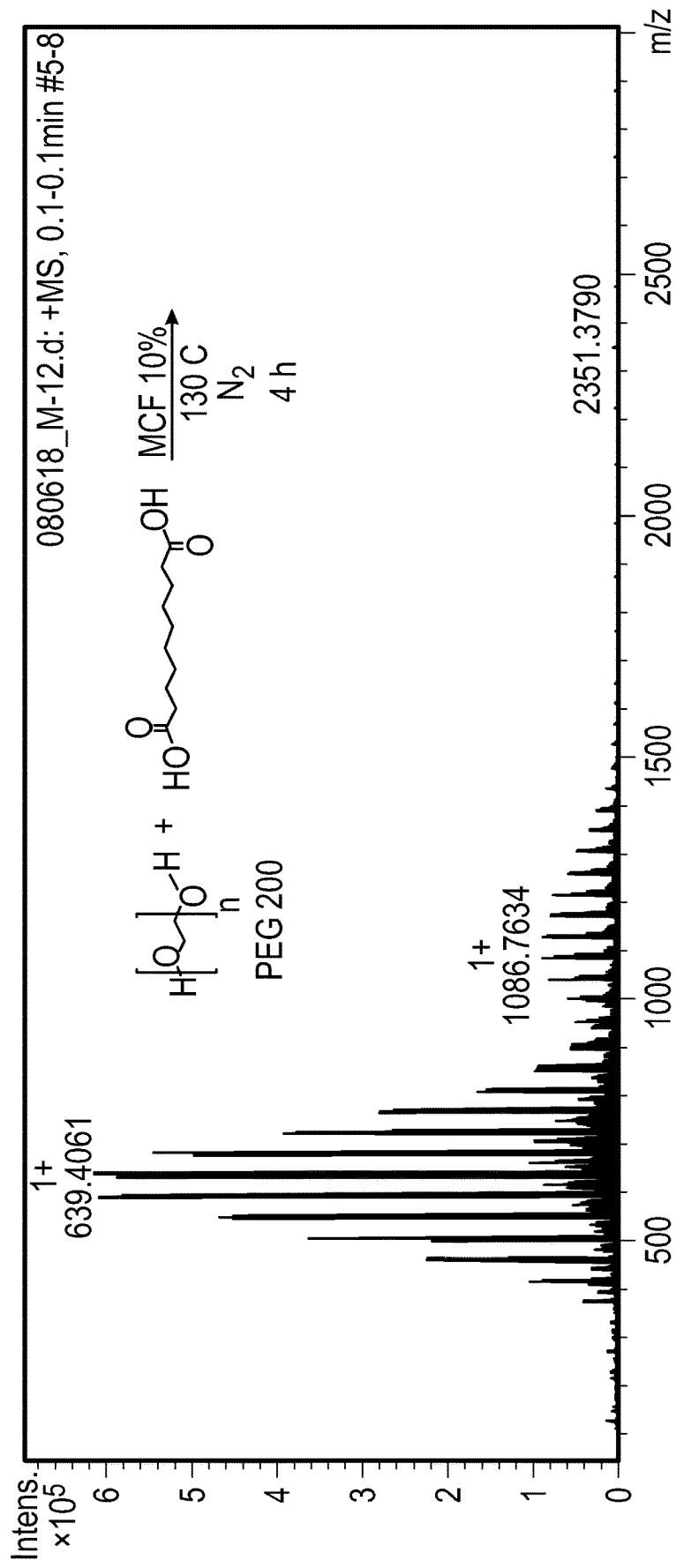

Chromatographic Analysis of Products from the Polyethylene-glycol (PEG) Esterification (ESI) Reaction with 200 UMA and Sebacic Acid

(56) References Cited

OTHER PUBLICATIONS

Hofmann et al., "En route to multicatalysis: kinetic resolution of trans-cycloalkane-1,2-diols via oxidative esterification\", Chem. Commun., 2014, 50, 1221.

Chimienti et al., "Tungstophosphoric and tungstosilicic acids on carbon as acidic catalysts", Applied Catalysis A: General 208 (2001) 7-19.

Ferreira et al., "Acetylation of glycerol over heteropolyacids supported on activated carbon", Catalysis Communications 12 (2011) 573-576.

Dias et al., "Mesoporous silica-supported 12-tungstophosphoric acid catalysts for the liquid phase dehydration of D-xylose", Microporous and Mesoporous Materials 94 (2006) 214-225.

Caiado et al., "Alkoxylation of camphene over silica-occluded tungstophosphoric acid", Applied Catalysis A: General 451 (2013) 36-42.

Ferreira et al., "Esterification of glycerol with acetic acid over dodecamolybdophosphoric acid encaged in USY zeolite", Catalysis Communications 10 (2009) 481-484.

Mukai et al., "Preparation of encaged heteropoly acid catalyst by synthesizing 12-molybdophosphoric acid in the supercages of Y-type zeolite", Applied Catalysis A: General 165 (1997) 219-226.

Caiado et al., "Valorization of Waste Cooking Oil into Biodiesel over Heteropolyacids Immobilized on Mesoporous Silica—A Kinetic Study", Intech 2015, 16 pages.

Castanheiro et al., "Hydration of a-pinene over molybdophosphoric acid immobilized in hydrophobically modified PVA membranes", Catalysis Today 104 (2005) 296-304.

Choi et al., "Performance of shell and tube-type membrane reactors equipped with heteropolyacid-polymer composite catalytic membranes", Catalysis Today 67 (2001) 237-245.

Sadjadi et al., "Current advances in the utility of functionalized SBA mesoporous silica for developing encapsulated nanocatalysts: state of the art", RSC Adv., 2017, 7, 30815.

Kurhade et al., "Surface Investigation of Tungstophosphoric Acid Supported on Ordered Mesoporous Aluminosilicates for Biodiesel Synthesis", ACS Omega 2018, 3, 14064-14075.

Wang et al., "Electrostatic immobilization of phosphomolybdic acid on imidazolium-based mesoporous organosilicas for catalytic olefin epoxidation", Chinese Journal of Catalysis 35 (2014) 532-539.

Zhao et al., "Polyoxometalate-based ionic complexes immobilized in mesoporous silicas prepared via a one-pot procedure: Efficient and reusable catalysts for $H_2O_2$-mediated alcohol oxidations in aqueous media", Microporous and Mesoporous Materials 172 (2013) 67-76.

Bordoloi et al., "Heteropoly acid-based supported ionic liquid-phase catalyst for the selective oxidation of alcohols", Journal of Catalysis 259 (2008) 232-239.

Ribeiro et al., "Oxidative desulfurization strategies using Keggin-type polyoxometalate catalysts: biphasic versus solvent-free systems", Catalysis Today (2018), https://doi.org/10.1016/j.cattod.2018.10.046.

Kocaman et al., "Isobutene oligomerization on MCM-41-supported tungstophosphoric acid", Molecular Catalysis 457 (2018) 41-50.

Pinto et al., "Comparison of the Acidity of Heteropolyacids Encapsulated in or Impregnated on SBA-15", Oil & Gas Science and Technology—Rev. IFP Energies nouvelles (2016) 71, 25.

Chen et al., "Glycerol acetalization with formaldehyde using heteropolyacid salts supported on mesostructured silica", Applied Catalysis A, General https://doi.org/10.1016/j.apcata.2017.09.027.

Tayebee et al., "$H_5PW_{10}V_2O_{40}$/pyridino-SBA-15 as a highly recyclable, robust and efficient inorganic-organic hybrid material for the catalytic preparation of bis(indolyl)methanes", Journal of Molecular Catalysis A: Chemical 366 (2013) 140-148.

Tayebee et al., "A new inorganic-organic hybrid material Al-SBA-15-TPI/$H_6P_2W_{18}O_{62}$ catalyzed one-pot, three-component synthesis of 2H-Indazolo[2,1-b]phthalazine-triones", Dalton Trans. 2015 DOI: 10.1039/C4DT03504F.

Tayebee et al., "$H_5PW_{10}V_2O_{40}$/Pip-SBA-15: A novel reusable organic-inorganic hybrid material as potent Lewis acid catalyst for one-pot solvent-free synthesis of 3,4-dihydropyrimidinones", Journal of Molecular Catalysis A: Chemical 366 (2013) 266-274.

Zhang et al., "One-pot synthesis of ordered mesoporous silica encapsulated polyoxometalates-based ionic liquids induced efficient desulfurization of organosulfur in fuel", RSC Adv., 2015, DOI: 10.1039/C5RA13787J.

Shojaei et al., "A green, reusable and highly efficient solid acid catalyst for the oxidation of aldehydes to the corresponding carboxylic acids using $H_2O_2$ and $KMnO_4$:$H_5PV_2Mo_{10}O_{40}$ (10-molybdo-2--vanadophosphoric heteropolyacid)", J. Serb. Chem. Soc. 76 (11) 1513-1522 (2011).

Zhao et al., "Triblock Copolymer Syntheses of Mesoporous Silica with Periodic 50 to 300 Angstrom Pores", Science, vol. 279, Jan. 23, 1998.

Schmidt-Winkel et al., "Mesocellular Siliceous Foams with Uniformly Sized Cells and Windows", J. Am. Chem. Soc. 1999, 121, 254-255.

Hoo et al., "Direct synthesis of mesoporous 12-tungstophosphoric acid SBA-15 catalyst for selective esterification of glycerol and lauric acid to monolaurate", Chemical Engineering Journal 250 (2014) 274-287.

Hernandez et al., "A Green Approach to the Production of 2-pyridone Derivatives Promoted by Infrared Irradiation", J. Mex. Chem. Soc. 2014, 58(2), 152-158.

Hernandez et al., "Synthesis, ex vivo and in silico studies of 3-cyano-2-pyridone derivatives with vasorelaxant activity", European Journal of Medicinal Chemistry 70 (2013) 669-676.

Sanchez et al., "Infrared Irradiation-Assisted Multicomponent Synthesis of 2-Amino-3-cyano-4H-pyran Derivatives", J. Mex. Chem. Soc. 2012, 56(2), 121-127.

* cited by examiner

HETEROGENEOUS CATALYST WITH MULTICATALYTIC ACTIVITY

CROSS-REFERENCE TO RELATED APPLICATIONS

The present disclosure claims the benefit of the filing date of Mexican Application No. MX/a/2021/009548 filed with the Mexican Patent Office on Aug. 9, 2021, the entire contents of which is incorporated herein by reference.

DESCRIPTION

Technical Field of the Invention

This invention belongs to the field of catalytic materials and it consists of a heterogeneous catalyst with the following characteristics: a) it contains a mesoporous support that is based on structured silica with different geometries of pore arrangements in 1D, 2D or 3D with a range of diameter dimensions, b) its chemical functionalization is produced by supported ionic liquid and super acid acting as a counterion (tungsten polyoxometalate —Keggin acid-); (c) its dual activity derived from its components that impart activity as a Bronsted-Lowry acid and as an oxidizing agent; d) its application in chemical reactions such as condensation, oxidation, polymerization and esterification.

Background of the Invention

The effect of catalysts on reactions of interest to the chemical industry is the promotion of molecular transformations to obtain products and by-products selectively and at lower energy cost, which conveys lower economic costs derived from efficiency of the catalytic processes overall. These effects are derived from the properties of catalysts to lower the activation energy of chemical reactions, a decrease of the residence time of reactants and products, and a greater selectivity with respect to non-catalytic or thermal reactions. The term multi-catalysis was introduced by Schreiner and collaborators, when using peptides, because these systems allow the generation the products through a multi-stage process linearly. In any chemical process where a multi-catalyst acts, the initial reactants that undergo reaction generate molecular intermediates that are not separated along the reaction pathway, suffer sequential transformations in a shorter reaction time, which is advantageous for the catalyst regeneration. A multi-catalyst is then considered to be a set of individual catalysts or a catalyst with integrated catalytic functions.

In this line of development, heteropolyacids (HPAs) have demonstrated significant advantages as catalysts for various chemical transformations of industrial interest, these are low-cost catalysts in general and have a low environmental impact. These catalysts are classified as strong Bronsted acids type and some present very strong acidity, with some classified as superacid materials. Some show rapid multi-electronic reversibility in Redox-type transformations, even under mild reaction conditions. However, they have limitations such as their low specific area (1-10 $m^2/g$) and their homogeneous nature with respect to the continuous reaction phases in which they participate, which motivated the interest in developing strategies for the preparation supported catalytic phases on different supports, such as activated carbon, silica, zeolites, structured silica (SBA-15 type) and polymer matrices. These preparation methods are newer trends for "heterogenization" of homogeneous phase heteropolyacids and represent alternate routes that may lead to technical and economic advantages with possible recovering of the spent catalysts using phase separation methods.

A strategy related to the "heterogenization" involves the immobilization of heteropolyacids (HPAs) that are associated with different active metals such as molybdenum, vanadium (V) and tungsten (W), through the use of supports and ionic liquids that interact at the surface level with polar materials, such as those based on silica, alumina, etc., in which porous matrices are the seat of an active surface with high ion exchange capacity, that promotes the formation of oxygen "bridges" (Table 1).

TABLE 1

Physicochemical properties of supported HPAs.

| | Material | $S_{BET}$ ($m^2/g$) | $V(poro)_{total}$ ($cm^3/g$) |
|---|---|---|---|
| 1 | SBA-15$^a$/PW-NH$_2$-SBA-15$^b$ | 1050/735 | 1.38/0.62 |
| 2 | SBA-15$^a$/PW$_{11}$@aptesSBA-15$^b$ | 725/240 | 0.971/0.399 |
| 3 | MCM-41$^a$/TPA (1/90 wt %)$^b$ | 865/17 | 0.72/0.02 |
| 4 | SBA-15$^a$/HPW@SBA-15 (24.6%)$^b$ | 834/368 | 1.10/0.48 |
| 5 | KIT-6$^a$/CsHPWO-KIT-6 (40%)$^b$ | 768/486 | 0.98/0.53 |
| 6 | SBA-16$^a$/CsHPWO-SBA-16 (30%)$^b$ | 843/494 | 0.87/0.45 |
| 7 | SBA-15$^a$/CsHPWO-SBA-15 (30%)$^b$ | 840/443 | 11/0.64 |
| 8 | SBA-15$^a$/VILSBA-15$^b$ | 714/209 | ND |

$S_{BET}$ = specific area; $V(pore)_{total}$: total volume.
$^a$Pure material; $^b$functionalized material These types of hybrid catalysts are capable of chemo-selectively oxidizing primary and secondary alcohols to produce aldehydes and ketones, respectively under aerobic conditions. In this sense, the use of iso-nicotinamide as a binding agent in silica materials with hpAs of vanadium and tungsten (HPA/TPI-SBA-15) has been used for the synthesis of bis(indoyl)methane, and indazole [2,1-b]phthalazine. A similar strategy was reported by using piperazine as a binding agent, in which the materials were used as catalysts to generate Biginelli's products. In addition, mesoporous materials with an ordered structure based on silica and others encapsulated with ionic polyoxomethalates-liquids have been prepared for use in the process of desulfurization of fuels under oxidizing conditions. On the other hand, these materials have been used for trans-esterification of spent oils using different alcohols. They have also been used as catalysts in oxidative desulphurization processes for diesel, as well as in the oligomerization of isobutene to convert light olefins into liquid fuels, or to carry out glycerol protection with aldehydes, and the oxidation of aldehydes to carboxylic acids by applying $H_2O_2$ and $KMnO_4$ as oxidants. In all these reports only one reaction is mentioned.

The synthesis of analogues to these materials (see CA2348874A1), employ a mesoporous material of the MCM-41 type with pores of the order of 50 Å in diameter, dispersed in tungstophosphoric acid (20-100%) in the presence of cesium carbonate ($Cs_2CO_3$), but this development does not use ionic liquids. Similarly, U.S. Pat. No. 9,340,733 B2 and U.S. Pat. No. 9,376,639 B2 describe the synthesis of polyoxometallates into mesostructured silicon oxides whose pore sizes are between 1.5 to 50 nm and with wall thicknesses of 1-30 nm, which have been tested as catalysts for gasoline hydrodesulfurization.

The heterogeneous catalyst described in this application contains three components that allow it to be versatile in its application compared to those reported. It is a mesoporous material with different pore diameters and structural arrangement, its functionalization with ionic liquids is covalent which generates unique physicochemical properties such as specific area ($S_{BET}$) between 72 and 308 (m²/g), with a total pore volume (total v) between 0.99 to 0.29 (cm³/g) and a concentration of acid sites ($C_{sa}$) from 1.4 to 6.2 (meq/g), these properties are given by the interaction with the pores of the materials avoiding the leaching of the active components. Finally, the counterion shows a confinement and reuse by regenerating up to 5 times which indicates that it does not present leaching, in addition, to the multicatalytic capacity as acid and oxidative catalysis.

This type of catalyst offers significant advantages for the chemical industry, for example: 1) it is reusable; 2) promotes different transformations in a single stage, attributed to their acidic and oxidizing characteristics (dual action) and 3) efficiency in the chemical transformations described, which in particular are applied to obtain precursors of homogeneous catalysts for hydroprocessing reactions, e.g. hydrogenation, hydro-disintegration, hydro-isomerization, etc., which are of interest for the transformation of heavy crude oils, in particular for applications related to the catalytic transformation of these fractions in situ.

BRIEF DESCRIPTION OF THE FIGURES OF THE INVENTION

FIG. 1. Chromatogram of the esterification reaction (ESI) between polyethylene glycol with 200 UMA and sebacic acid; and FIG. 2. Chromatogram of the polymerization reaction of nonylphenol with formaldehyde and a heterogeneous catalyst.

DETAILED DESCRIPTION OF THE INVENTION

The present invention consists first of the synthesis of mesoporous materials ordered based on silica and its functionalization by grafting an ionic liquid at the surface level and its subsequent metathesis process with a Keggin acid, to prepare heterogeneous catalysts with multicatalytic activity that promote hydroprocessing reactions, which has been tested by the different chemical reactions.

Example 1. Synthesis of Mesoporous Materials of the SBA-15 Type

In a polypropylene container with lid, 16.2 g of Pluronic P123 (Sigma-Aldrich, Mv=5800) were weighed, then dissolved in 375 mL of HCl 1.6 M solution (JT Baker, 37%). The reaction mixture was stirred at 35-40° C. for 4 h, keeping the temperature constant by oil bath. 37.0 mL of tetraethylortosilicate (TEOS, Sigma-Aldrich, 97%) were added by drip, by peristaltic pump with a flow of (0.9 mL/min). The polypropylene container is hermetically closed and stirred at the same temperature for 20 h (hydrolysis stage). Then the temperature is set to 80° C. and maintained for 24 h under static conditions (aging stage). The reaction mixture is cooled to room temperature and filtered under vacuum. The resulting solid is washed with 650 mL of distilled water. It dries at 60° C. by 12 h and calcines as follows: 120° C. (1 h, 5° C./min), 550 (6 h, 1° C./min), 50° C. (0.5 h, 5° C./min). The particle size is homogenized at 150 μm.

Example 2. Mesoporous Silica Synthesis with Ordered Pore Arrangements

The material based on porous silica is obtained by the following steps: a quantity of tri-block polymer EO/PO is dissolved in water, adding a solution of 1 to 5 molar containing hydrochloric or citric acid, to form a first mixture that is heated to 40-50° ° C., adding to that mixture 20 to 40 mmol of tetraethylortosilicate (TEOS: Sigma-Aldrich, Mv=5800), under constant stirring (at 35-40° C., 2 h at 750 rpm), by using a peristaltic pump, with a flow of 0.9 mL/min, to obtain the first reaction product. This is cooled to room temperature and filtered under vacuum, then washed with 650 mL of a mixture of EtOH: H2O (1:1). It is dried at 60° C. by 12 h before calcining the dry material in air or nitrogen atmosphere as follows: 120° C. (1 h, 5° C./min), 550 (6 h, 1° C./min), 50° C. (0.5 h, 5° C./min). The particle size is homogenized at 150 μm. This material has an average pore size between 3 and 30 nm, as well as a wall thickness between 1.5 and 2.5 nm and specific area between 500 and 1000 m²/g, specific areas greater than 800 m2/g and even greater than 1,000 m²/g are also obtained.

Example 3. Ordered Mesoporous Silica Synthesis with Variable Morphologies and Pore Arrangements An aqueous solution of 4.5% p of structuring agents (CTAB or EO/PO tri-block) at concentrations of 0.49245×10⁻³ M, is prepared in demineralized and de-ionized water, (208.3×10-3 M), adding 60×10-3 M of co-solvents $C_2H_5OH$ or $C_3H_7OH$ and then added 6.47×10-3 M of ammonium hydroxide. Then 1.20×10-3 M of Tetraethyletoplasty (TEOS) is added. After a few minutes a translucent gel is formed that dries at 40° C. for 8 h, before calcining at 550° C. in nitrogen atmosphere, and then in air for 4 h. Reagent concentrations can be easily scaled to obtain higher production for the applications of interest. Thus, the structuring agent ratios (AEs) of CTAB/$NH_4OH$ or EO/PO-triblock/$NH_4OH$ of 0.076:1 and combinations of AE(CTAB or EO/PO)/Co-solvents ($C_2H_5OH$ or $C_3H_7OH$) with molar ratios of 0.008211 lead to the obtaining of porous silica materials with particle morphologies and variable pore arrangements (sphere, ellipsoids, etc.) with one, two and three dimensions of pores or nanotubes in the same particle, of 3.5 nm of average diameter, which is verified by X-ray diffraction (XRD) and TEM techniques.

Example 4. Synthesis of Ionic Liquid

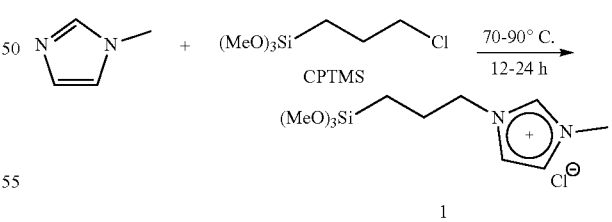

In a flask of 50 to 250 mL, 2.5-12.5 mL of N-methylimidazole (Sigma-Aldrich, 99%) and 2.5-12.5 mL of chloropropyltrimethoxysilane (CPTMS, Sigma-Aldrich, 97%) were placed. The reaction mixture was stirred at 70-90° C. with magnetic stirrer under nitrogen atmosphere for 12-24 h. Subsequently, it is cooled to room temperature and washed with $Et_2O$ anhydrous (3×20 mL). The liquid obtained was vacuum dried to generate the desired product (1). The ionic liquid was stored under nitrogen atmosphere.

Example 5. Synthesis of the Ionic Liquid Grafting Covalent in Two Steps

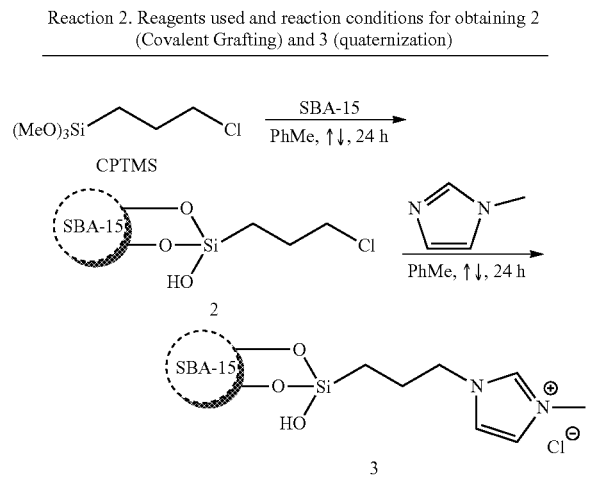

Reaction 2. Reagents used and reaction conditions for obtaining 2 (Covalent Grafting) and 3 (quaternization)

Reaction with CPTMS: In a 50 mL flask with agitator, 5.0 g of mesoporous silica, 15.6 mL of CPTMS (0.08 mol) and 75 mL of anhydrous PhMe are placed. The reaction mixture is brought to reflux and stirred for 24 h. It is cooled to room temperature, the solid is vacuum filtered and washed successively with 100 mL of PhMe and 100 mL of DCM.

Reaction with N-methylimidazole: In a 50 mL flask with agitator are placed 1.0 g of SBA-15-Cl (2), 0.97 mL of N-methylimidazole (0.08 mol, Sigma-Aldrich, 99%) and 25 mL of anhydrous PhMe. The reaction mixture is brought to reflux and stirred for 24 h. It is cooled to room temperature, the solid is vacuum filtered and washed successively with 100 mL of PhMe and 100 mL of DCM.

Example 6. Functionalization of Silica with Ionic Liquids in One Step

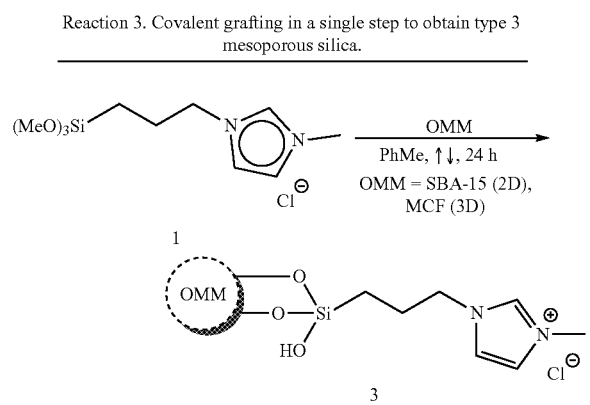

Reaction 3. Covalent grafting in a single step to obtain type 3 mesoporous silica.

In a 50 mL flask with agitator are placed 1.0 g of mesoporous silica (SBA-15 or MCF, 16.7 mmol), 0.5 g of ionic liquid (1, 1.78 mmol) and 25 mL of anhydrous PhMe. The reaction mixture is brought to reflux and stirred for 24 h. It is cooled to room temperature, the solid is vacuum filtered and washed successively with 20 mL of PhMe and 20 mL of DCM. The solid is then washed with DCE in a Soxhlet extractor for 24 hours. The solid is vacuum dried to generate the product (2). Immobilization of Keggin's heteropolyacid, $H_3PW_{12}O_{40}$ (HPW).

Example 7. Direct Impregnation

In a 50 mL dry flask with agitator, phosphotungstic acid (Sigma-Aldrich) is dissolved in 25 mL of absolute EtOH. 0.5 g of pure silica is added. The obtained suspension is stirred at room temperature for 12 h. The ethanol is evaporated and dried under vacuum (50 mbar, 40° C., 1 h). Catalysts with loads of 0.1, 0.5, and 1.0 mmol/g of HPW are prepared.

Example 8. Effect of Washing on Direct Impregnation

In a dry flask of 50 mL with agitator the phosphotungstic acid (Sigma-Aldrich) is dissolved in 25 mL of absolute EtOH. 0.5 g of pure silica is added. The obtained suspension is stirred at room temperature for 12 h. The solid is vacuum filtered and washed with absolute EtOH (3×20 mL). Finally, it is dried under vacuum (50 mbar, 40° C., 1 h). This is how catalysts are prepared with loads of 0.1, 0.5, 1.0 mmol/g of HPW.

Example 9. Chloride Ion Metathesis in Mesoporous Silicas Modified with Ionic Liquids

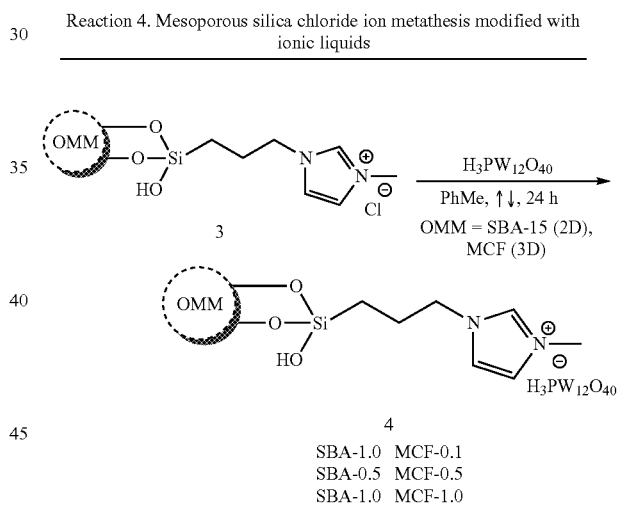

Reaction 4. Mesoporous silica chloride ion metathesis modified with ionic liquids

SBA-1.0  MCF-0.1
SBA-0.5  MCF-0.5
SBA-1.0  MCF-1.0

In a dry flask of 50 mL with agitator the phosphotungstic acid (Sigma-Aldrich) is dissolved in 25 mL of absolute EtOH. 0.5 g of functionalized silica is added (see reaction 2, structure 2). The obtained suspension is stirred at room temperature for 12 h. The ethanol is evaporated and dried under vacuum (50 mbar, 40° C., 1 h). This is how catalysts are prepared with loads of 0.1, 0.5, 1.0 mmol/g of HPW.

Example 10. Purification and Effect of Ethanol on the Metathesis Process

In a dry flask of 50 mL with agitator the phosphotungstic acid (Sigma-Aldrich) is dissolved in 25 mL of absolute EtOH. 0.5 g of functionalized silica is added (see reaction 2, structure 2). The obtained suspension is stirred at room temperature for 12 h. The solid is vacuum filtered and washed with absolute EtOH (3×20 mL). Finally, it is dried under vacuum (50 mbar, 40° C., 1 h). This is how catalysts are prepared with loads of 0.1, 0.5, 1.0 mmol/g of HPW.

Example 11. Use of Ultrasound in the Process of Metathesis in Modified Mesoporous Silicas In a dry flask of 50 mL with agitator the phosphotungstic acid (Sigma-Aldrich) is dissolved in 25 mL of absolute EtOH. The solution is shaken sonically for 5 min and adicionan 0.5 g of functionalized silica (see reaction 2, structure 2). Again it is sonically shaken for an additional 5 min. The obtained suspension is stirred at room temperature for 12 h. The solid is vacuum filtered and washed with absolute EtOH (3×20 mL). Finally it is dried under vacuum (50 mbar, 40° C., 1 h). This is how catalysts are prepared with loads of 0.1, 0.5, 1.0 mmol/g of HPW.

Table 2 describes the characteristics of raw materials and the examples described, in order to analyze the most important properties of these materials and the relationship with their application.

TABLE 2

Physicochemical properties of different hpAs supported obtained by the methods of invention

| | Material | Description | $S_{BET}$ (m²/g) | $V_p$ (cm³/g) | $D_p$ (nm) | $C_{sa}$ (meq/g) |
|---|---|---|---|---|---|---|
| RM | H₃PW₁₂O₄₀ | Pure heteropolyacid | NF | NF | NF | NF |
| RM | SBA-15 | Pure support | 859 | 0.94 | 5.9 | 1.1 |
| RM | MCF | Pure support | 803 | 1.22 | Window: 8.4 Cell: 18.6 | 1.0 |
| 1 | MIM-SBA15 | Support + IL | 308 | 0.52 | 5.3 | 1.4 |
| 2 | MIM-MCF | Support + IL | 259 | 0.99 | Window: 7.3 Cell: 17.0 | 2.2 |
| 4 | MIM-SBA-0.1 | Support + IL + 0.1 mmol/g HPW | 218 | 0.38 | 5.2 | 2.5 |
| 5 | MIM-SBA-0.5 | Support + IL + 0.5 mmol/g HPW | 165 | 0.23 | 4.4 | 3.9 |
| 6 | MIM-SBA-1.0 | Support + IL + 1.0 mmol/g HPW | 164 | 0.23 | 4.3 | 4.0 |
| 9 | MIM-MCF-0.1 | Support + IL + 0.1 mmol/g HPW | 143 | 0.50 | Window 6.6 Cell: 16.7 | 4.6 |
| 10 | MIM-MCF-0.5 | Support + IL + 0.5 mmol/g HPW | 140 | 0.50 | Window: 6.1 Cell: 15.3 | 5.3 |
| 11 | MIM-MCF-1.0 | Support + IL + 1.0 mmol/g HPW | 72 | 0.29 | Window: 6.1 Cell: 15.0 | 6.2 |

$S_{BET}$ = surface area; Total V: total volume. NF = not found, $D_p$ = Pore diameter, $C_{sa}$ = Concentration of acid sites; RM = Raw Material.

Analyzing the data in Table 1, it is observed that depending on the Keggin acid load (HPW), the specific area and volume decrease regardless of the material used (SBA and MCF). The acidity value is increased, but there are no bibliographic references to this value. The synthesis of mesoporous silica derivatives has been reported in the literature but materials with a composition involving the three components described based on silica, ionic liquid and keggin acid have not been described.

In contrast, the present invention describes the preparation of a new product, classified as a heterogeneous catalyst based on mesoporous silica covalently functionalized by an ionic liquid and as a counterion a tungsten polyoxometalate (Keggin acid) with unique properties such as specific area ($S_{BET}$) between 72 and 308 (m²/g); with total pore volume (total v) between 0.99 to 0.29 (cm³/g) and concentration of acid sites ($C_{sa}$) from 1.4 to 6.2 (meq/g).

The main advantages over the literature show that this product (catalyst) has a dual action: Bronsted-Lowry acid and oxidizing agent; In addition, this type of catalyst offers advantages for the chemical industry because it is reusable, carrying out different transformations in a single stage, attributed to its acidic and oxidizing characteristics (dual action), in addition to its efficiency to carry out chemical transformations.

Application Examples

This section describes the tests carried out to obtain organic molecules under different reaction conditions, demonstrating the tolerance and scope of this catalyst.

Example 12. REARRANGEMENT AND OXIDATION TO OBTAIN 2-PYRIDONES

Reaction 5. Application of the catalyst for the synthesis of 2-pyridones.

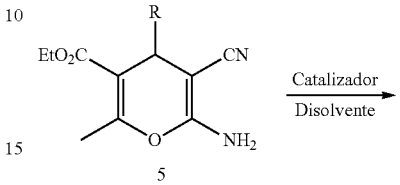

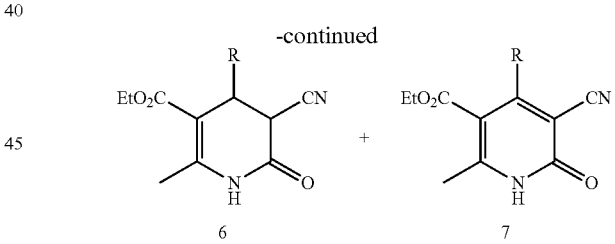

There are reports of the synthesis of 2-pyridones in two reaction stages using 4H-pyranes as raw materials (Reaction 5).

Por what the present invention made an analysis on the scope of the catalysts developed. The results show the ability of the catalysts developed to generate desired products through a mechanism of acid rearrangement and subsequent oxidation, additionally the catalyst is recovered later, once washed with ethanol it is dried at 100° C. and reused for up to 6 times maintaining a similar performance.

In the present invention begins with the 4 H-piran 5 (see reaction 5) (1.50 mmol) to which the solvent and catalyst are added according to Table 3. The mixture is heated to the indicated temperature and times (Reaction 5 and Table 3). The progress of the reaction is monitored by thin layer chromatography (t/c) (hexane/EtOAc, 7:3) and purification is performed by recrystallization under an H₂O/Et₀H system (95/5).

TABLE 3

Application of the catalyst in rearrangement and oxidation reactions.

| Catalyst | Load (% wt) | Solvent | T(° C.) | t(h) | Conc.(M) | 2(%) | 3(%) |
|---|---|---|---|---|---|---|---|
| MIM-SBA-0.1 | 10 | EtOH | 120 | 12 | 0.1 | n.d. | n.d. |
| MIM-SBA-0.1 | 25 | EtOH | 120 | 12 | 0.2 | Trace | n.d. |
| MIM-SBA-1.0 | 25 | EtOH | 120 | 12 | 0.2 | 34 | n.d. |
| MIM-MCF-0.1 | 25 | EtOH | 120 | 12 | 0.2 | Trace | Trace |
| MIM-MCF-1.0 | 25 | EtOH | 120 | 12 | 0.2 | 64 | 27 |
| MIM-MCF-1.0 | 50 | EtOH | 120 | 12 | 0.1 | 25 | 18 |
| MIM-MCF-1.0 | 25 | EtOH:$H_2O$ (1:1) | 120 | 12 | 0.2 | 13 | 80 |
| MIM-MCF-1.0 | 25 | MeCN | 120 | 12 | 0.2 | n.d. | n.d. |
| MIM-MCF-1.0 | 25 | MeCN:$H_2O$ (1:1) | 120 | 12 | 0.2 | 24 | 72 |
| MIM-MCF-1.0 | 25 | $H_2O$ | 120 | 12 | 0.2 | 34 | 58 |
| MIM-MCF-1.0 | 25 | EtOH:$H_2O$ (1:1) | 120 | 24 | 0.2 | n.d. | 93 (88) |
| MIM-MCF-1.0 | 10 | EtOH | 80 | 12 | 0.1 | 73 | 25 | nd: undetected

Example 13. Reaction of Multicomponents to Obtain 2-Pyridones

Reaction 6. Applicatino of the catalyst in the synthesis of 2-pyridones by the reaction of multicomponents

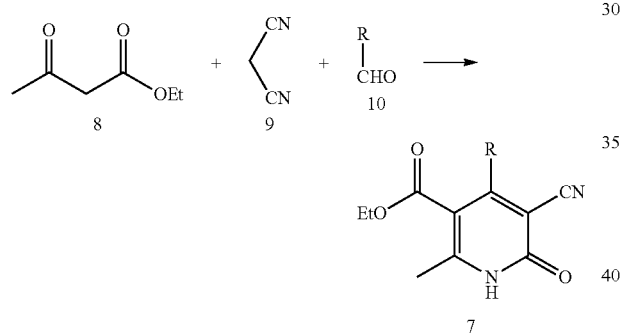

The present invention was proposed to obtain a catalyst that could favor the generation of 2-pyridones in a single reaction stage, and for this purpose aldehyde 10 (3.0 mmol), malononitrile 9 (3.0 mmol), ethyl acetoacetate 8 (see reaction 6) (3.0 mmol) and catalyst were used, which are placed in a 25 mL flask with a capacitor. The mixture reaches 120° C. by a conventional heating form for 24 h, in an EtOH/$H_2O$ mixture. The reaction is monitored by $^1$H NMR or t/c. Once the reaction is finished, it is cooled and purified by recrystallization in a water/ethanol mixture, generating 2-pyridone with a 52% yield, which proves the versatility of the catalyst (Reaction 6).

Example 14. ESTERIFICATION REACTION

Reaction 7. Esterification reaction

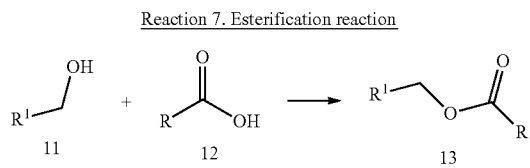

The esterification reaction between the alcohols and different carboxylic acids was carried out in a 1:1 ratio, with the MIM-MCF-1.0 catalyst, for which the reaction is monitored by the negative variation of the acid number (TAN), which has a value of 60 at the beginning of the reaction and this decays to 12, depending on the type of acid used (Table 4), for this, the percentage of catalyst was varied until the minimum acid number value (TAN) was achieved. This minimum value is achieved with the reaction time and with the heterogeneous catalyst MIM-MCF-1.0 at 10% wt. In almost all cases monoesterification and diesterification reactions are observed, while the recovery of the catalyst and its regeneration yield the same TAN value up to 5 times, after being washed and dried at 120° C. (Reaction 7).

TABLE 4

Products of the esterification reaction

| Alcohol | Acid | Catalyst | TAN |
|---|---|---|---|
| Isosorbide | Stearic acid | MIM-MCF-1.0 (10%) | 38 |
| PEG 200 | Adipic acid | MIM-MCF-1.0 (10%) | 37 |
| PEG 200 | Adipic acid | MIM-MCF-1.0 (20%) | 29 |
| PEG 200 | Adipic acid | MIM-MCF-1.0 (30%) | 20 |
| PEG 200 | Sebacic acid | MIM-MCF-1.0 (10%) | 12 |

In a flask of two mouths of 100 ml the alcohol and the catalyst are placed. A Dean-Stark trap is adapted to a mouth, which is connected to a vacuum wrench, perfectly sealing the mouths with Teflon, then heated to 130° C. for 3 h, with periodic sampling to measure the acid number (TAN). The distribution of molecular weights is shown in FIG. 1 (see section of Figures), the study is carried out using the technique of mass spectrometry (EI method) between polyethylene glycol of molecular weight of 200 m/z (PEG 200) and sebacic acid, where the molecular distribution indicates that monoesterification and diesterification reactions are carried out (Reaction 8).

Reaction 8. Sebacic acid esterification reaction

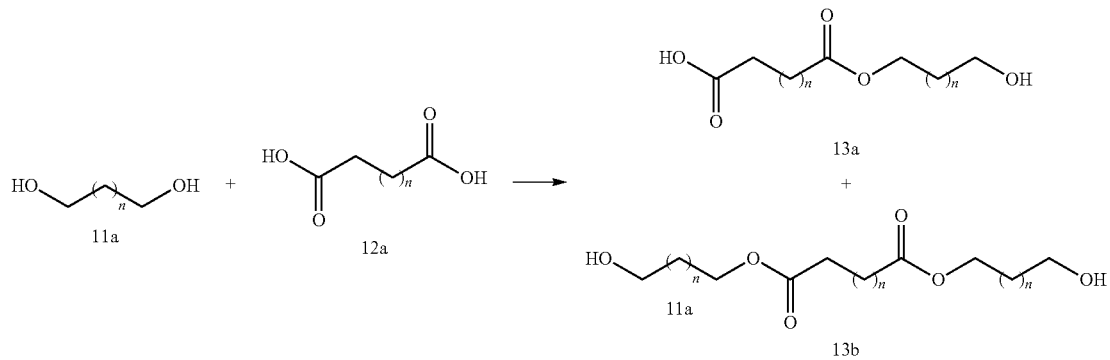

Example 15. POLYMERIZATION REACTION

Figure 2:
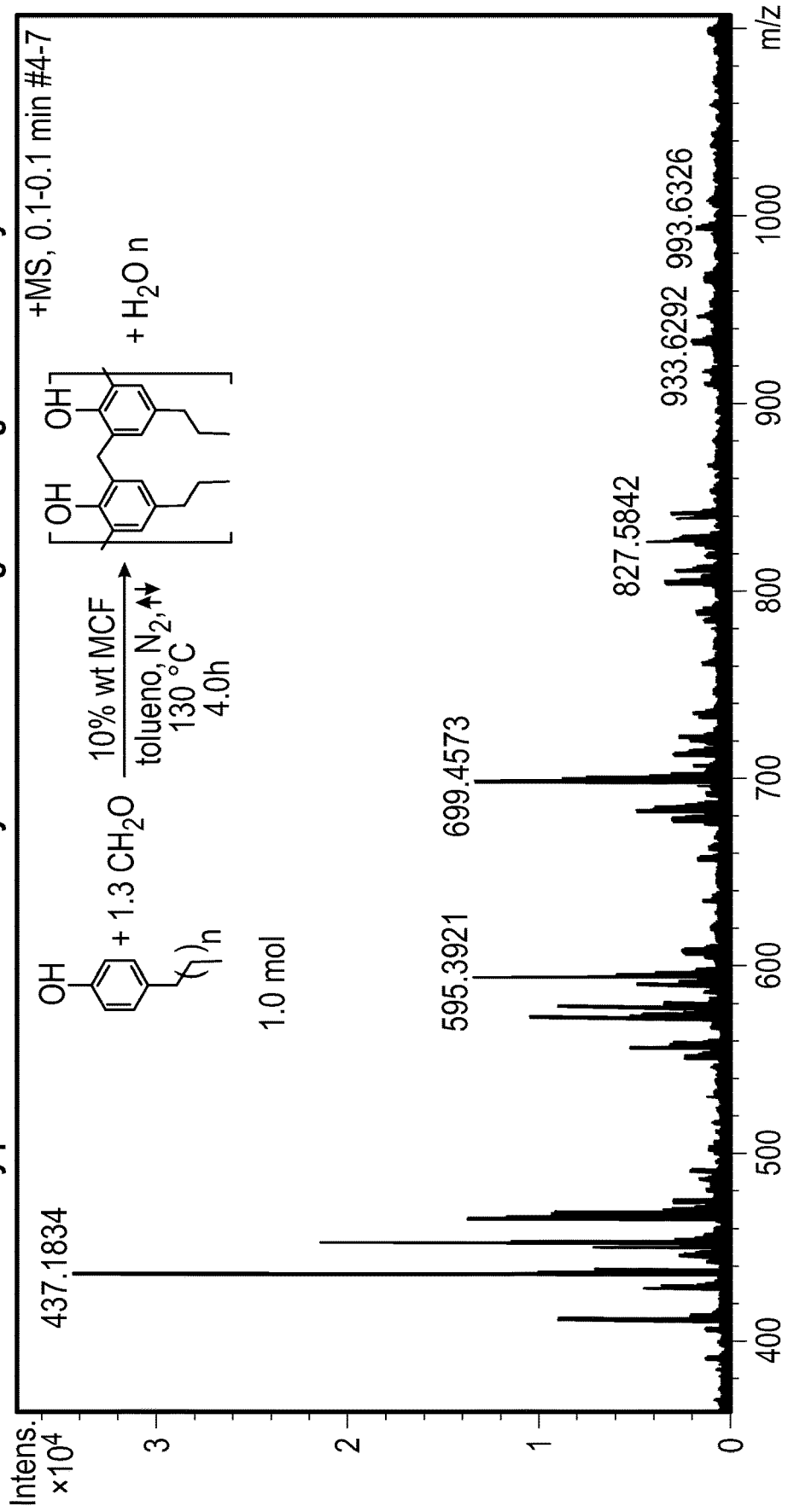

Derived from the acidity of MIM-MCF catalysts at 0.1 (4.6 meq/g), 0.5 (5.3 meq/g), and 1 (6.2 meq/g) mmol/g HPW, its application in polymerization reactions using phenol and formaldehyde derivatives was tested. The importance of these products stems from their potential use for the formulation of crude oil dehydrating agents. In a two-mouth flask of 100 mL weigh 5 g of nonylphenol, 0.9 g of paraformaldehyde, 7.5 mL of toluene, adding 10% of the catalyst. One of the flask mouths adapts to a condenser and the other to a Dean-Stark trap, which is filled with toluene for the dragging of water generated during the condensation process. It is heated to 130° C. for 2-3 h, taking samples every 30 min, measuring the ISR value until the most appropriate one is achieved, e.g. 5.0. At the beginning of a test, the ISR of nonylphenol was measured, being equal to 0.8, so this value should be increased during the condensation process with the paraformaldehyde and the acid catalyst (Reaction 9). FIG. 2 shows the analysis by the technique of mass spectrometry (MALDI-TOF), the distribution of molecular weights of this reaction, which indicates that the maximum degree of polymerization was 4.5 and the lowest was equal to 2.

Reaction 9. Alkylphenol polymerization reaction

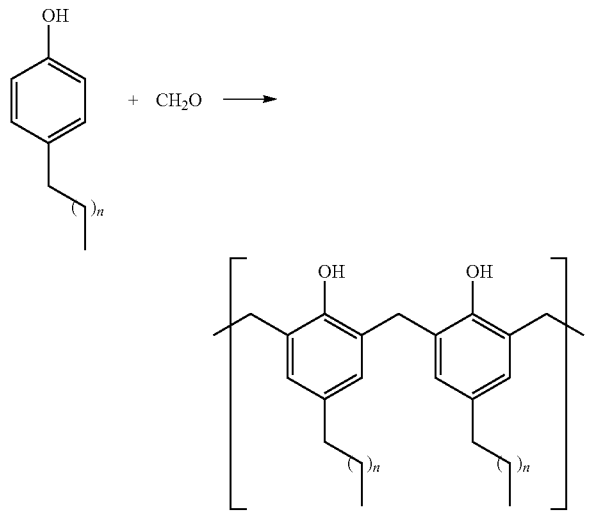

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

The invention claimed is:

1. A process for preparing a heterogeneous catalyst with multicatalytic activity containing a group with an anionic character and another organic cationic, a combination of the anionic character group and the organic cationic group forming an ionic liquid which is integrated on a mesoporous silica support, with a structural chemical formula:

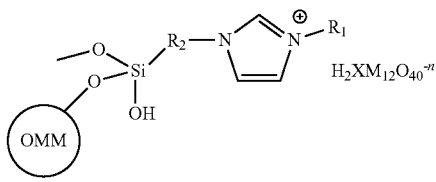

where:
- $R_1$ is a substituted alkyl, alkyl, aryl group or substituted aryl;
- $R_2$ is a chain of 1 to 4 carbon atoms;
- X is a chemical element selected from the group consisting of Aluminum (Al), Silicon (Si), Phosphorus (P) or Sulfur (S);
- M is a chemical element of the type Molybdenum (Mo), Tungsten (W), Vanadium (V) Titanium (Ti) or Zirconium (Zr);
- OMM is a mesoporous silica support; and
- n is the charge number, wherein the process comprises the following steps in order:
providing an ionic liquid derived from imidazolium, wherein said ionic liquid comprises the following structural formula:

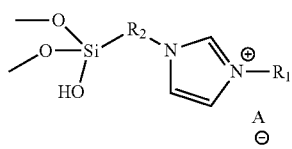

wherein A is an anion;

covalently anchoring the ionic liquid to a mesoporous silica support to produce an ionic functional hybrid compound comprising the following structural formula:

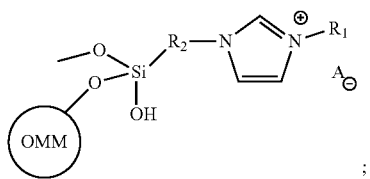

and exchanging anion A via Ion exchange of anion A of the ionic functional hybrid compound with a polyoxometalate (POM) of formula $H_2XM_{12}O_{40}{}^{n-}$, thereby yielding the heterogenous catalyst having the structural chemical formula as follows:

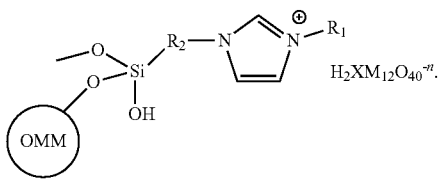

2. The process according to claim 1, wherein an order of addition of is performed according to order (a) or order (b) below:

order (a): (1) nitrogenous heterocyclic aromatic organic compound replaced with $R_1$, (2) compound (3-HalideR$_2$)trimethoxysilane, (3) mesoporous silica support, and (4) polyoxometalate; or order (b): (1) compound (3-HalideR$_2$)trimethoxysilane, (2) mesoporous silica support, (3) the nitrogenous heterocyclic aromatic organic compound substituted with $R_1$, and (4) polyoxometalate.

3. The process according to claim 1, in which the temperature of the preparation in a single step is between 0° and +100° C.

4. The process according to claim 1, in which the preparation time in a single step is between 10 to 100 hours.

5. The process according to claim 1, in which the molar ratio of the compounds is 1:1:0.1 or 0.5 or 1:1 respectively, for:

(a) (1) nitrogenous heterocyclic aromatic organic compound replaced with $R_1$, (2) compound (3-HalideR$_2$) trimethoxysilane, (3) mesoporous silica support and (4) polyoxometalate or (b) (1) compound (3-HalideR$_2$)trimethoxysilane, (2) mesoporous silica support, (3) the nitrogenous heterocyclic aromatic organic compound substituted with R1, and (4) the polyoxometalate acid is 1:0.1 or 0.5 or 1:1:1 respectively.

6. The process according to claim 1, wherein the catalyst has dual acid characteristics of a Bronsted-Lowry acid with concentration of acid sites of 1.0 to 7 (meq/g) and oxidants.

7. The process according to claim 1, wherein the catalyst has the characteristic of being regenerable.

8. The process according to claim 1, wherein the catalyst has a specific area ($S_{BET}$) between 70 and 310 (m²/g).

9. The process according to claim 1, wherein the catalyst has a total pore volume ($_{total}$V) between 0.99 to 0.3 (cm³/g).

10. The process according to claim 1, wherein the organic cationic group is a nitrogenous heterocyclic aromatic organic compound.

11. The process according to claim 10, wherein the cationic component is an imidazolium type substituted with $R_1$.

12. The process according to claim 11, wherein $R_1$ is selected from the group consisting of a substituted alkyl, alkyl group, aryl group and substituted aryl group.

13. The process according to claim 12, wherein $R_1$ is an alkyl containing from 1 to 6 carbon atoms.

14. The process according to claim 1, wherein (3-HalideR$_2$)trimethoxysilane is used to form the cationic group of the ionic liquid.

15. The process according to claim 14, wherein the halide of (3-HalideR$_2$)trimethoxysilane is a chlorine, bromine group, referred to as "A".

16. The process according to claim 15, wherein the alkyl group $R_2$ is a chain of 1 to 4 carbon atoms.

17. The process according to claim 1, wherein the heterogeneous catalyst is formed by the ionic liquid and the silica support, characterized by the latter presenting ordered arrangements of pores in the range of mesoporous materials.

18. The process according to claim 17, wherein the heterogeneous catalyst comprises an ionic liquid supported on mesoporous silica, characterized by the fact that the latter has networks of pores in one, two and three dimensions.

19. The process according to claim 18, wherein the heterogeneous catalyst further comprises a functionalized silica support, characterized by synthesis in the presence of an organic compound containing the cation of the ionic liquid.

20. The process according to claim 1, wherein ion exchange of anion A with a heteropolyacid of formula $H_3XM_{12}O_{40}$, generates the heteropolyanion of polyoxometalate (POMs) of formula $H_2XM_{12}O_{40}{}^{n-}$.

21. The process according to claim 20, wherein the metal phase M of polyoxometalate (POMs) of formula $H_2XM_{12}O_{40}{}^{n-}$ is selected from the group consisting of Molybdenum (Mo), Tungsten (W), Vanadium (V) Titanium (Ti) and Zirconium (Zr).

22. The process according to claim 21, wherein the X component of polyoxometalate (POMs) of formula $H_2XM_{12}O_{40}{}^{n-}$ is selected from the group consisting of Aluminum (Al), Silicon (Si), Phosphorus (P) and Sulfur(S).

23. The process according to claim 22, wherein the polyoxometalate of formula $XM_{12}O_{40}{}^{n-}$, includes a metallic phase in which M is Tungsten (W), X is Phosphorus (P) and n is an integer corresponding to the charge number generated from the acid $H_3PW_{12}O_{40}$ that generates the acid of formula $H_2PW_{12}O_{40}-$.

* * * * *